(12) United States Patent
Huang et al.

(10) Patent No.: US 6,970,297 B2
(45) Date of Patent: Nov. 29, 2005

(54) LENS FOR FORMING LASER LINES WITH UNIFORM BRIGHTNESS

(75) Inventors: Chao-Chi Huang, Taipei (TW); Kevin Weng, Keelung (TW); Der-Shyang Jan, Taipei (TW)

(73) Assignee: Quarton Inc., (TW)

( * ) Notice: Subject to any disclaimer, the term of this patent is extended or adjusted under 35 U.S.C. 154(b) by 0 days.

(21) Appl. No.: 10/849,418

(22) Filed: May 18, 2004

(65) Prior Publication Data
US 2005/0013009 A1 Jan. 20, 2005

(30) Foreign Application Priority Data
Jul. 15, 2003 (TW) ................................. 92119199 A

(51) Int. Cl.⁷ ..................... G02B 11/00; G02B 13/00
(52) U.S. Cl. ................... 359/642; 359/719; 359/720
(58) Field of Search .......................... 359/642, 718, 359/719, 720, 743

(56) References Cited

U.S. PATENT DOCUMENTS

| | | |
|---|---|---|
| 6,201,229 B1 * | 3/2001 | Tawa et al. ............... 250/201.5 |
| 6,801,368 B2 * | 10/2004 | Coufal et al. ................ 359/708 |
| 2002/0067549 A1 * | 6/2002 | Tawa et al. .................. 359/642 |

* cited by examiner

Primary Examiner—Jordan M. Schwartz
(74) Attorney, Agent, or Firm—Raymond Sun

(57) ABSTRACT

A lens is provided for converting a laser beam into laser lines of uniform brightness. The lens has an emission plane through which the laser beam passes, the emission plane having a continuous incline. There is also provided a method for designing the lens.

11 Claims, 4 Drawing Sheets

| Equal Partition Point | Altitude H (mm) | Distance L (mm) | Refraction $\theta$ | Emitting-Out-Plance Angle $\phi$ |
|---|---|---|---|---|
| $P_1$ | 50 | $L_1$ = 10000 | $\theta_1$ = 0.286477 | $\phi_1$ = 0.5829 |
| $P_2$ | 50 | $L_2$ = 9000 | $\theta_2$ = 0.318307 | $\phi_2$ = 0.6470 |
| $P_3$ | 50 | $L_3$ = 8000 | $\theta_3$ = 0.358094 | $\phi_3$ = 0.7280 |
| $P_4$ | 50 | $L_4$ = 7000 | $\theta_4$ = 0.409249 | $\phi_4$ = 0.8320 |
| $P_5$ | 50 | $L_5$ = 6000 | $\theta_5$ = 0.477454 | $\phi_5$ = 0.9710 |
| $P_6$ | 50 | $L_6$ = 5000 | $\theta_6$ = 0.572939 | $\phi_6$ = 1.1650 |
| $P_7$ | 50 | $L_7$ = 4000 | $\theta_7$ = 0.716160 | $\phi_7$ = 1.4560 |
| $P_8$ | 50 | $L_8$ = 3000 | $\theta_8$ = 0.954841 | $\phi_8$ = 1.9405 |
| $P_9$ | 50 | $L_9$ = 2000 | $\theta_9$ = 1.432096 | $\phi_9$ = 2.9080 |
| $P_{10}$ | 50 | $L_{10}$ = 1000 | $\theta_{10}$ = 2.862405 | $\phi_{10}$ = 5.7845 |
| ⋮ | ⋮ | ⋮ | ⋮ | ⋮ |
| $P_{N+1}$ | 50 | $L_{N+1}$ = 50 | $\theta_{N+1}$ = 45 | $\phi_{N+1}$ = 42.0265 |

FIG. 5

LENS FOR FORMING LASER LINES WITH UNIFORM BRIGHTNESS

BACKGROUND OF THE INVENTION

1. Field of the Invention

The present invention relates to laser devices, and in particular, to a lens, and a design method for a lens, that is capable of forming a laser beam having uniform energy distribution so that the laser beam can be distributed into laser lines of uniform brightness along a plane.

2. Description of the Prior Art

The structure of a conventional laser lens typically includes a light converting device at the emitting side of the laser beam of a laser beam emitter (or emitting module). The common light converting devices include convex lens, cylindrical lens, and multi-angle prisms, among others, which are utilized together with rotary elements or elements of other contours to extend a laser beam of point form into a laser line, a laser ring, or a laser light of different kinds. Such laser lights are primarily used for horizontal measurement, for distance measurement, or for indication, in the field of architectural engineering.

FIG. 1 illustrates a known laser point and line projecting device that is illustrated in Republic of China (Taiwan) Patent No. 491349. The laser point and line projecting device 10 provides two methods for converting laser beam into a laser line. A first method is to upright a light source vertically by arranging a point light-source projector 11 under a rotary motor 12, on top of which a pentagonal prism 13 is arranged. When the rotary motor 12 rotates, the pentagonal prism 13 converts the laser beam projected from the point light-source projector 11 into a laser ring 15. A second method is to arrange the light emitting side of another point light-source projector 14 at a rectangular hollow trough 141 to convert the laser beam into a laser line 16. However, the formation of the laser ring 15 must depend upon the rotation of the motor 12 driven by the power supply, so the size of the machine must be very large. Furthermore, the range of the laser line 16 is restrained by the rectangular hollow trough 141. After the laser line 16 is diffused, its brightness is concentrated in a central section, with the rest of the laser line 16 being fuzzy due to the elongation caused by the long distance from the center of the laser line 16, such that the brightness of the laser line 16 will not be uniform (i.e., the laser line 16 is brighter at the center), thereby negatively impacting the measurement.

FIG. 2 illustrates another example of a "Laser Line Generating Device" from WO 02/093108 A1. The laser line generating device 20 has a lens 22 that has a straight plane 222 and a convex plane 221. The lens 22 is arranged in front of the laser point light-source projector 21. When the laser beam 23 enters the lens 22, part of the laser light is refracted by the convex plane 221 to change its advancing direction to become a laser light 231 that is inclined downwardly. The laser light passing through the straight plane 222 is emitted in parallel to become a parallel laser light 232. The main purpose of WO 02/093108 A1 is to generate a fan-shaped laser light, the strength of which is similar to a "comet" shape, such that the emitted laser demarcating light will not be blocked by objects to affect measurement. In practice, since the curvature of the convex plane 221 can differ, the refracting angle of the laser light 231 can also differ. In this regard, if the curvature of the convex plane 221 is not correct, then the uniformity of the formed laser line will be adversely affected.

SUMMARY OF THE INVENTION

It is an object of the present invention to provide a lens that is capable of forming a light beam having uniform energy distribution.

It is another object of the present invention to provide a method for creating a lens that is capable of forming a light beam having uniform energy distribution.

It is yet another object of the present invention to provide a lens that is capable of forming a light beam that is distributed into laser lines of uniform brightness, such that line visualization at greater distances can be facilitated.

It is yet a further object of the present invention to provide a lens that has an emitting plane with a continuous incline such that, when the laser beam passes through the emitting plane at different angles, the laser beam may be refracted onto several equal partition lengths, such that the laser beam is distributed into laser lines on a plane with uniform brightness.

In order to achieve the objectives of the present invention, there is provided a lens that converts a laser beam into laser lines of uniform brightness. The lens has an emission plane through which the laser beam passes, the emission plane having a continuous incline.

The present invention also provides a method for designing a lens that converts a laser beam into laser lines of uniform brightness on a planar surface.

BRIEF DESCRIPTION OF THE DRAWINGS

FIG. 5 is a design value table for the lens according to the present invention.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
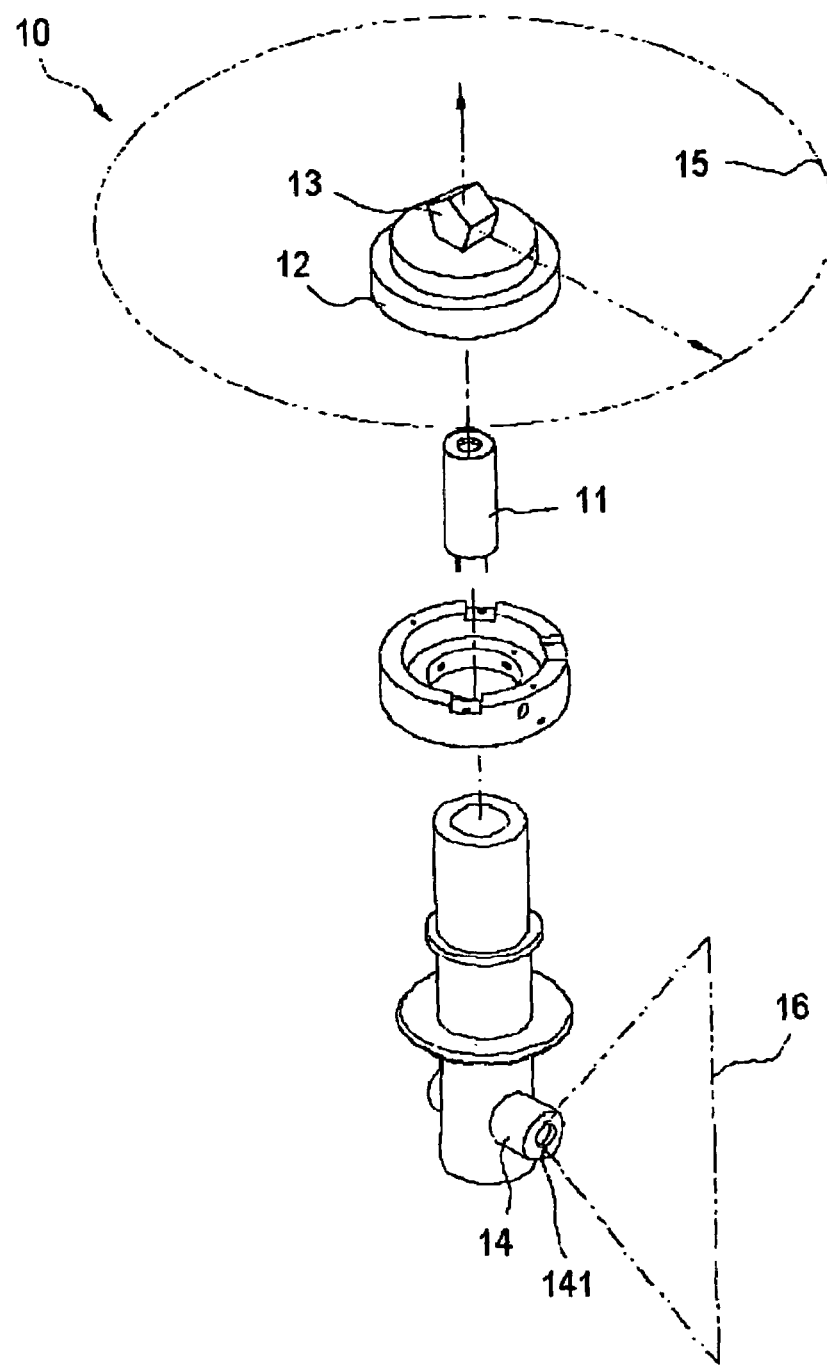
FIG. 1 illustrates a conventional laser point and line projecting device.
Figure 2:
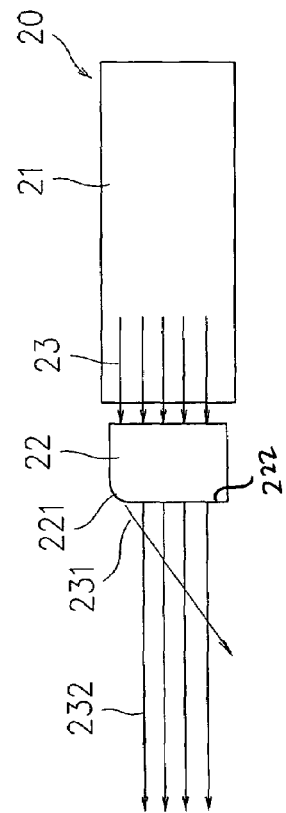
FIG. 2 illustrates the laser light projection for a conventional laser line generating device.
Figure 3:
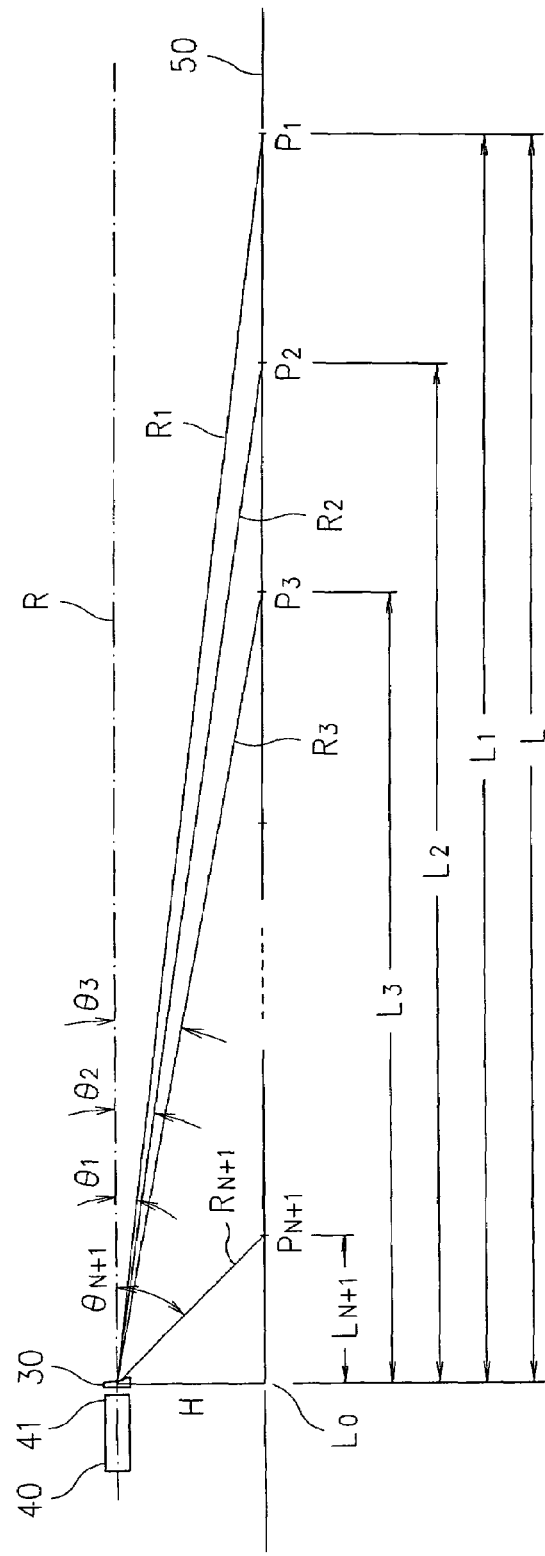
FIG. 3 illustrates the laser light projection for a lens according to the present invention.
Figure 4:
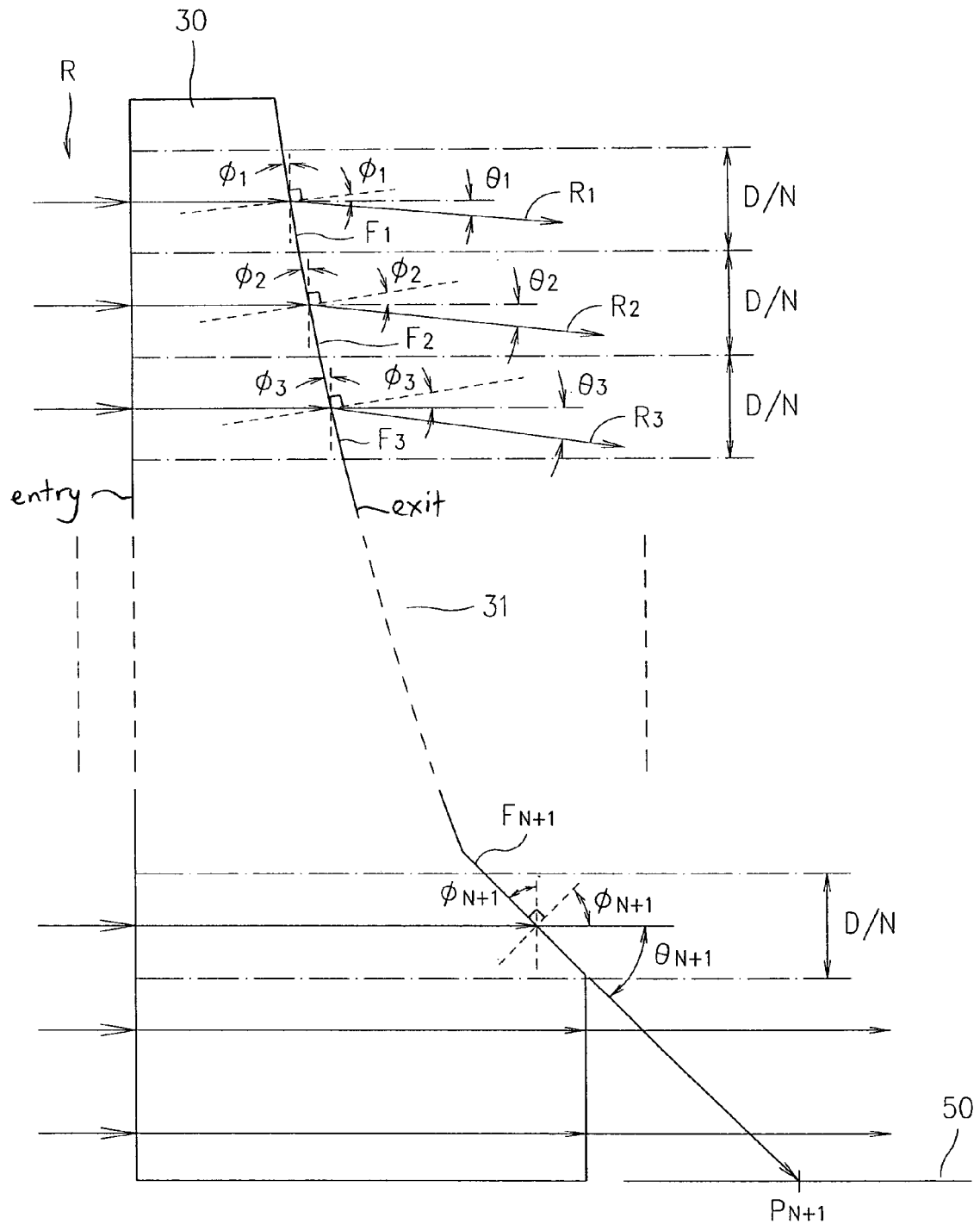
FIG. 4 is a side plan view for a lens according to the present invention.

FIGS. 3–4 illustrate a lens 30 according to the present invention. The lens 30 is capable of forming a light beam having uniform energy distribution. The lens 30 is arranged at the emitting end 41 of an optical device 40, which generates a laser beam R. The laser beam R is parallel to a plane 50 that is maintained at an altitude H from the parallel laser beam R.

A length L is set on the plane 50 and is taken to be the length of the laser lines formed on the plane 50 by projecting the laser beam R. The length L is divided into a plurality of equal partitions to obtain a plurality of equal partition points $P_1, P_2, P_3 \ldots P_{N+1}$. The distances $L_1, L_2, L_3 \ldots L_{N+1}$ are distances measured from the starting point $L_0$ of the length L to the equal partition points $P_1, P_2, P_3 \ldots P_{N+1}$ respectively, with the partition point $P_1$ located at the end of the length L, so the distance $L_1$ between the partition point $P_1$ and the starting point $L_0$ is same as the length L.

Here, input the altitude H, and the plural distances $L_1$, $L_2$, $L_3$ ... $L_{N+1}$ measured between each of the partition points $P_1$, $P_2$, $P_3$ ... $P_{N+1}$ and the starting point $L_0$ of laser beam, into the tangent formula of trigonometric function as follows.

$$\theta_N = \tan^{-1}(H/L_N)$$

From this formula, the refraction angles $\theta_1$, $\theta_2$, and $\theta_3$ ... $\theta_{N+1}$ measured by refracting the laser beam R to each of the partition points $P_1$, $P_2$, $P_3$ ... $P_{N+1}$ can be calculated. Here, please refer to the data value table shown in FIG. 5. If the altitude H is 50 mm, the length distance $L_1$ of partition point $P_1$ is 10000 mm, which means that the set length L of the laser lines is 10000 mm, and the subsequent points $P_2$, $P_3$ are separated by 1000 mm, then $L_2$ and $L_3$ are 9000 mm and 8000 mm, respectively. Thus, if the separation distance between each partition point P is 1000 mm, then the length $L_{N+1}$ of the partition point $P_{N+1}$ should be 0 mm. However, from the data shown in FIG. 5, when the partition point is closer to the optical device 40, its refraction angle $\theta$ will increase, and this rate of increase for the refraction angle will also increase as the partition point becomes closer to the optical device 40. Thus, when it is desired to obtain laser lines having uniform brightness, plural partition points having smaller partition distances therebetween must be further inserted at the vicinity of the optical device 40. In other words, the partition distances for the points located between the points $P_{10}$ and $P_{N+1}$ may be decreased, such as by 250 mm, 200 mm, or 100 mm, etc., and the distance $L_{N+1}$ between the starting point $L_0$ and the point $P_{N+1}$ can be set as 50 mm. As a result, the obtained refraction angles $\theta_1$, $\theta_2$, $\theta_3$ ... $\theta_{N+1}$ represent the necessary angles for the laser beams $R_1$, $R_2$, $R_3$ ... $R_{N+1}$ that are intended to be projected onto each partition point $P_1$, $P_2$, $P_3$ ... $P_{N+1}$.

Next, input the refractive index n of the lens 30 and the obtained plural refraction angles $\theta_1$, $\theta_2$, $\theta_3$ ... $\theta_{N+1}$ into Snell's Law as follows:

$$n \sin(\phi_N) = \sin(\theta_N + \phi_N)$$

i.e., $\phi_N = \tan^{-1}[\sin(\theta_N)/(n - \cos(\theta_N))]$

The refractive index n is dependent upon the material of the lens 30. For example, if an acrylic is adopted, then its refractivity is 1.4917. Thus, a plurality of plane angles $\phi_1$, $\phi_2$, $\phi_3$ ... $\phi_{N+1}$ may be obtained. If the diameter of laser beam R is assumed to be D, and the laser beam R is divided equally to N sections (i.e., N is the dividing number of the laser beam R), then the altitude of each section of inclines $F_1$, $F_2$, $F_3$ ... $F_{N+1}$ is D/N. If it is intended to make laser beams $R_1$, $R_2$, $R_3$ ... $R_{N+1}$ generate respective refraction angles $\theta_1$, $\theta_2$, $\theta_3$ ... $\theta_{N+1}$, it is necessary to make these laser beams $R_1$, $R_2$, $R_3$ ... $R_{N+1}$ pass through respective inclines $F_1$, $F_2$, $F_3$ ... $F_{N+1}$ of different plane angles $\phi_1$, $\phi_2$, $\phi_3$ ... $\phi_{N+1}$. The inclines $F_1$, $F_2$, $F_3$ ... $F_{N+1}$ can then be smoothed by smooth curves, such that a resulting emission plane 31 of the lens 30 may be obtained.

As best shown in FIG. 4, the lens 30 has an entry surface and an exit surface, wherein the laser beam enters the lens via the entry surface and exits the lens via the exit surface. The continuous incline is illustrated as being on the exit surface, but can also be on the entry surface.

In addition, a number of different factors can influence the formation result of the laser line and have to be considered during the design. These factors include, but are not limited to, the diameter of the laser beam, the size of the lens, the length of the laser line, the distance between the laser beam and the plane, the number of partition points, and the material of the lens (refractive index), etc.

In summary, the design method for the lens 30 according to the present invention includes following steps:

(A) Set a length L, which is taken as the length of the laser lines formed on the plane 50, and the length L starts from a starting point $L_0$ at one side adjacent the optical device 40.

(B) Set an altitude H, which is the vertical distance between the laser beam R and the plane 50.

(C) Divide the length L into a plurality of equal partitions, such that plural partition points $P_1$, $P_2$ ... $P_{N+1}$ of equal partition distance may be obtained.

(D) Measure the distances $L_1$, $L_2$, $L_3$ ... $L_{N+1}$ between the starting point $L_0$ and each partition point $P_1$, $P_2$, $P_3$ ... $P_{N+1}$.

(E) Input the altitude H, and the distances $L_1$, $L_2$, $L_3$ ... $L_{N+1}$ measured between the starting point $L_0$ and each partition point $P_1$, $P_2$, $P_3$ ... $P_{N+1}$, into the tangent formula of trigonometric function to obtain plural refraction angles $\theta_1$, $\theta_2$, $\theta_3$ ... $\theta_{N+1}$, by which the plurality of laser beams are refracted onto each partition point.

(F) Input the refractive index n of the lens 30 and the plurality of refraction angles $\theta_1$, $\theta_2$, $\theta_3$ ... $\theta_{N+1}$ that were obtained previously, into Snell's Law, such that a plurality of plane angles $\phi_1$, $\phi_2$, $\phi_3$ ... $\phi_{N+1}$ of the lens 30 may be obtained.

(G) According to the obtained plurality of plane angles $\phi_1$, $\phi_2$, $\phi_3$ ... $\phi_{N+1}$, it is possible to form continuous inclines $F_1$, $F_2$, $F_3$ ... $F_{N+1}$ on the lens 30.

(H) Smooth the continuous inclines $F_1$, $F_2$, $F_3$ ... $F_{N+1}$ to construct a smooth concave emission plane 31.

As a result, when the laser beam R passes through the emission plane 31, the laser beam R may be refracted onto each respective partition point $P_1$, $P_2$, $P_3$ ... $P_{N+1}$, such that the laser beam R is extended into laser lines having uniform brightness on the plane 50, wherein the continuous inclines $F_1$, $F_2$, $F_3$ ... $F_{N+1}$ may be arranged as a single plane on the lens 30 (as shown in FIG. 4). It is also possible to arrange these inclines $F_1$, $F_2$, $F_3$ ... $F_{N+1}$ on two opposite sides of the lens 30 to make the laser beam R facilitate other refracting effects.

Additionally, in the illustrated embodiments, the lens 30 and the optical device 40 may be two separate elements; in other words, it is also possible to modularize the lens 30 and the optical device 40 into one body, but the fulfilled effects are the same as those of the aforementioned embodiments.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method for designing a lens that converts a laser beam into laser lines of uniform brightness on a planar surface, the lens having a refractive index, the method including the following steps:

a. setting a length, which is taken as the length of the laser lines formed on the planar surface, with the length starting from a starting point at the lens;

b. setting an altitude, which is the distance between the laser beam and the plane;

c. dividing the length into a plurality of equal partitions to obtain a plurality of partition points that are spaced equi-distantly apart from each other;

d. calculating a plurality of refraction angles based on the altitude and the distances between the starting point and each partition point;

e. calculating a plurality of plane angles for the lens based on the refractive index of the lens and the plurality of refraction angles; and f. forming a continuous incline on the lens based on the plane angles.

2. The method of claim 1, further including:

d1. measuring the distances between the starting point and each partition point.

3. The method of claim 1, wherein step d further includes: inputting the altitude and the distances between the starting point and each partition point into the tangent formula of trigonometric function to obtain the plurality of refraction angles.

4. The method of claim 1, wherein the plurality of refraction angles refract the laser beam onto the respective partition points.

5. The method of claim 1, wherein step e further includes: inputting the refractive index of the lens and the plurality of refraction angles into Snell's Law to obtain the plurality of plane angles for the lens.

6. The method of claim 1, wherein the continuous incline is smoothed to construct a smooth concave emission plane.

7. The method of claim 1, wherein the lens has an entry surface and an exit surface, wherein the laser beam enters the lens via the entry surface and exits the lens via the exit surface, and wherein the continuous incline is on the exit surface.

8. The method of claim 1, wherein the lens has an entry surface and an exit surface, wherein the laser beam enters the lens via the entry surface and exits the lens via the exit surface, and wherein the continuous incline is on the entry surface.

9. A lens that converts a laser beam into laser lines of uniform brightness, comprising an emission plane through which the laser beam passes, the emission plane having a continuous incline which is formed according to the following steps:

a. setting a length, which is taken as the length of the laser lines formed on the planar surface, with the length starting from a starting point at the lens;

b. setting an altitude, which is the distance between the laser beam and the plane;

c. dividing the length into a plurality of equal partitions to obtain a plurality of partition points that are spaced equi-distantly apart from each other;

d. calculating a plurality of refraction angles based on the altitude and the distances between the starting point and each partition point;

e. calculating a plurality of plane angles for the lens based on the refractive index of the lens and the plurality of refraction angles; and f. forming a continuous incline on the lens based on the plane angles.

10. The lens of claim 9, wherein the lens has an entry surface and an exit surface, wherein the laser beam enters the lens via the entry surface and exits the lens via the exit surface, and wherein the continuous incline is on the exit surface.

11. The lens of claim 9, wherein the lens has an entry surface and an exit surface, wherein the laser beam enters the lens via the entry surface and exits the lens via the exit surface, and wherein the continuous incline is on the entry surface.

* * * * *